United States Patent [19]
McCloskey

[11] 3,960,107
[45] June 1, 1976

[54] EXPANDABLE IRRIGATION SIGNAL

[76] Inventor: Edward W. McCloskey, 439-1/2 Riverside Drive, Burbank, Calif. 91506

[22] Filed: May 27, 1975

[21] Appl. No.: 580,662

[52] U.S. Cl.................... 116/118 A; 116/DIG. 7
[51] Int. Cl.²......................................... G01F 23/08
[58] Field of Search....... 116/118 R, 118 A, DIG. 7; 73/305; 61/12

[56] References Cited
UNITED STATES PATENTS

| | | | |
|---|---|---|---|
| 1,138,285 | 5/1915 | Green | 116/118 R |
| 2,082,763 | 6/1937 | Garrison | 116/118 A |
| 2,607,835 | 8/1952 | Bonar | 116/118 R |

*Primary Examiner*—S. C. Swisher
*Assistant Examiner*—Denis E. Corr
*Attorney, Agent, or Firm*—Whann & McManigal

[57] ABSTRACT

An irrigation signal which has a cylindrical body to receive a cylindrical float, the body having an upper portion and a lower portion, the lower portion being adapted to extend below the bottom of the irrigation ditch in which it is installed in order to form a well in which irrigation water may enter in order to raise said float. A signal connected to said float by a rod is positioned in the top of the body, and upon the raising of said float is pushed from the top of said body and automatically extends to be plainly visible from a distance to signal that irrigation water is present in said ditch. When irrigation is stopped the water will drain from the lower end of the body so that the signalling float will lower and exert a downward pull on the signal. The signal will collapse and be pulled into the top end of the body into nonsignalling position.

6 Claims, 7 Drawing Figures

U.S. Patent June 1, 1976 3,960,107
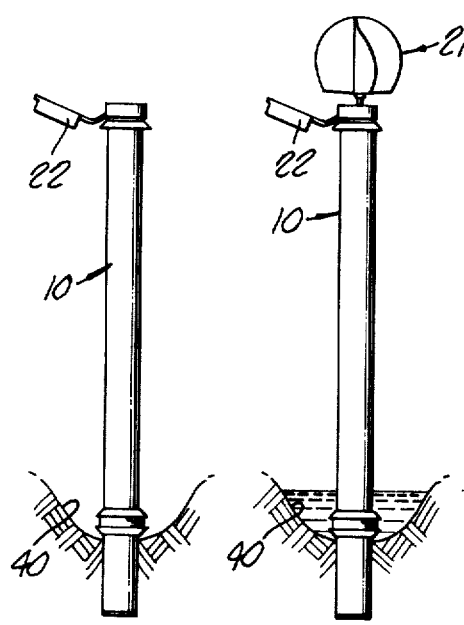
FIG. 1. FIG. 2.
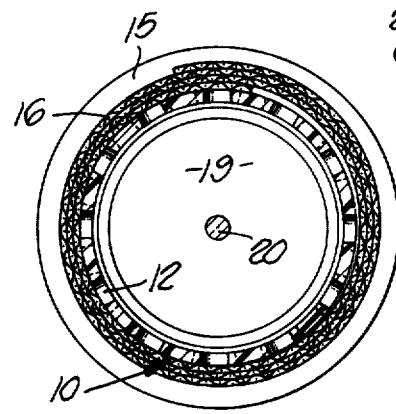
FIG. 7.
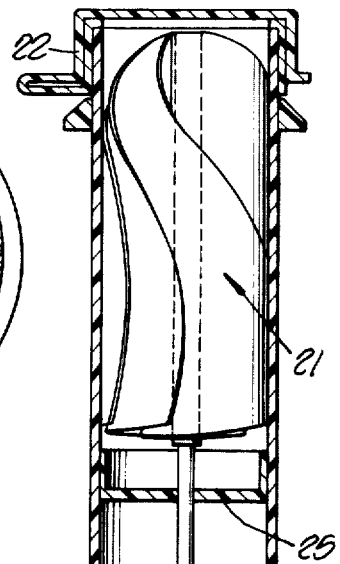
FIG. 3.
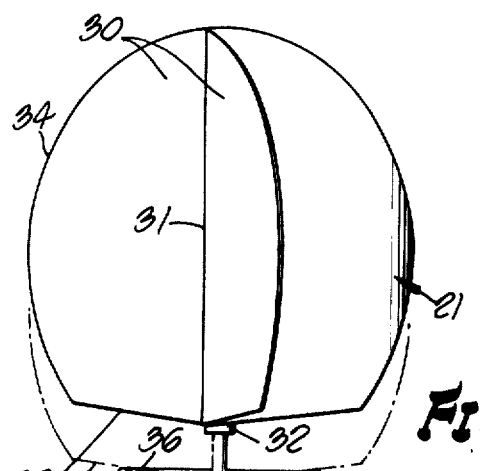
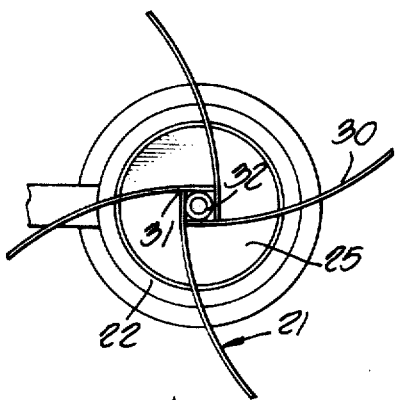
FIG. 5.
FIG. 4.
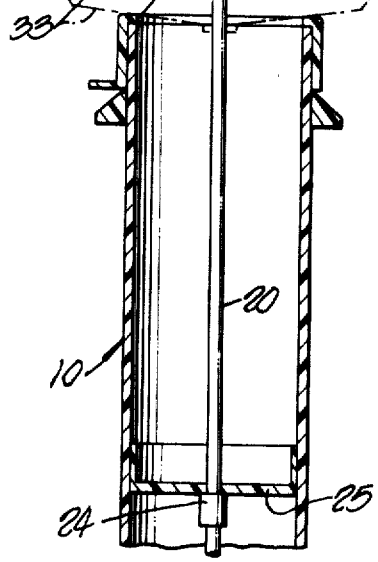
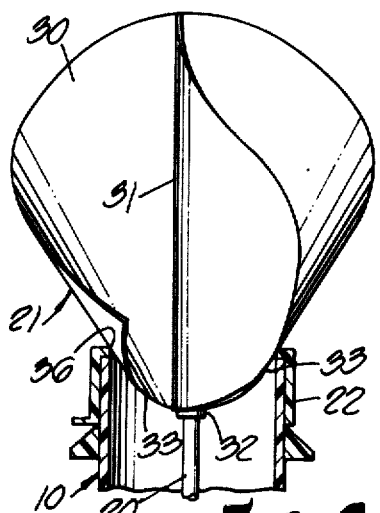
FIG. 6.
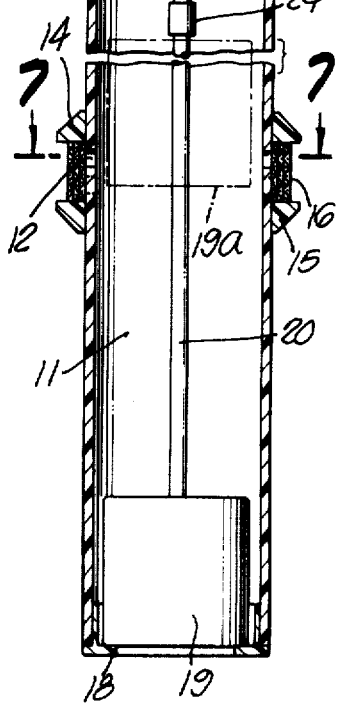

EXPANDABLE IRRIGATION SIGNAL

BACKGROUND OF THE INVENTION

This invention relates to irrigation signalling means for use on farms or ranches, or wherever irrigation ditches are used and it is desired to know that irrigation water is being properly handled in the ditches. It is a common practice to irrigate farms or orchards by digging long ditches. Water is introduced at one end of the ditch and flows throughout the entire length of the ditch in order to irrigate large areas. Farms and ranches may vary from a few acres to hundreds of acres. It is important to know that trees or plants or vines are being irrigated properly and the irrigator, therefore, must inspect the various irrigation ditches in order to be certain that water is or has been flowing through the ditches.

If an irrigator must visit each section of the property to determine the presence of irrigation water, considerable time would be required and also he might be required to climb through the plantings and destroy a portion of th crop being grown.

It has been the practice to provide a number of devices which will signal the presence of water in an irrigation ditch, these signals being positioned so that they can be observed from a road or other distant point. These devices for the most part include tripping devices and extend considerable distances above the ground and are subject to being knocked over or blown over, and those with which applicant is familiar are unsatisfactory.

SUMMARY OF THE INVENTION

It is an object of my invention to provide an irrigation device having an expandable signal which will be projected from an enclosure and will expand to a relatively larger size to signal the presence of water while water is in an irrigation ditch or the like.

It is an object of my invention to provide an irrigation device in which there is a body which has a lower portion which projects downwardly a distance below the bottom of the ditch in order to form a well in which a float is positioned, and in which, when said well is filled with water from the irrigation water flowing through the ditch, the float will be raised and project an expandable signal to give an adequate visual signal.

It is an object of my invention to provide a structure which is of simple design, economical and foolproof, nothing to get out of order, and can be easily installed and removed.

BRIEF DESCRIPTION OF THE DRAWINGS

FIG. 1 illustrates my invention installed in an irrigation ditch with the parts in non-signalling position;

FIG. 2 is a similar view but showing irrigation water in the ditch and the expandable signal in an exposed and expandable position;

FIG. 3 is an enlarged vertical sectional view showing the irrigation signal of my invention with the signal retracted;

FIG. 4 is an enlarged fragmentary sectional view showing the signal projected;

FIG. 5 is a plan view of FIG. 4.

FIG. 6 is a fragmentary sectional view of the upper end of the body showing how the signal is collapsed; and FIG. 7 is a cross-section on the line 7—7 of FIG. 3.

DESCRIPTION OF ONE FORM OF THE INVENTION

As shown in the drawings, the numeral 10 represents a cylindrical elongated body having a cylindrical float chamber 11 therein. Intermediate of the ends of the body and near the lower end are water entrance openings 12 arranged around the circumference of the body 10. Positioned around the body 10 are upper and lower shoulders 14 and 15 which protect a multi-layer screen 16 for preventing foreign matter from clogging the openings 12.

Resting against a bottom stop 18 is a float 19. Extending upwardly from the float 19 is a connecting means in the form of a rod 20 which has an expandable signal 21 secured to the upper end thereof, this expandable signal 21, when in retracted position, rests in the upper end of the cylindrical body 12, as shown in FIG. 3, and when the signal is not in use the upper end of the body may be closed by a cover 22. When the float chamber 11 is filled or partly filled with water the float is moved upward to dotted line position 19a. This brings the stop collar 24 on the rod 20 into engagement with a stop plate 25, positioned in the body 10, so that the expandable signal 21 is projected from the upper end of the body and into the extended or signalling position as shown in the fragmentary view of FIG. 4.

The expandable signal is formed from four segments 30, which have inner vertical edges 31 which are cemented to a central tube 32 through which the upper end of the rod 20 extends. From the lower end of the vertical edge 31 is a bottom wall 33 which inclines outwardly as shown in FIG. 6. There is an outer edge 34 which joins the outer end of the edge 33 and the upper end of the edge 31. The edge 34 is arcuated as shown to give each segment a generally triangular shape.

The segments are made from a plastic material which is flexible and may be easily curved from a plane position to a spiral position when in collapsed position within the upper end of the body 10.

When the signal 21 is moved upwardly the signal segments 30 are released from their confined collapsed position and normally and inherently move toward the plane position as shown in FIGS. 4 and 5. There is, however, as noted, a slight curvature. In this extended or signalling position the signal is relatively large and is easily seen even from a considerable distance. The signal may be of any bright color desired so that it is easy to see it from a distance.

A feature of the invention is that the signal automatically expands when it is projected from the upper end of the body 10 and is automatically collapsed when the water seeps or runs from the lower end of the body. This collapsing action takes place as follows: As shown in FIG. 6, the signal has moved downwardly a fraction of an inch from the position shown in FIG. 4 so that the inclined edges engage the curved top wall 36 of the body 10. At this time the weight of the rod 20 and the float 19 pull downwardly causing the lower edges 33 to pressurally engage the wall 36. The downward pressure causes the segments 30 to curve and the diameter of the signal is reduced so that the signal will fit within the upper end of the body 10. As the signal is lowered the signal, the rod, and the float rotate and this rotation, coupled with the inclination of the edges 33, cause the segments to be curved into spiral shape when looking at the signal from the top, and in this spiral shape the signal is compacted into the position as shown in FIG.

3. This action occurs automatically and it requires but little downward force, this force being applied by the weight of the rod and float. The action of the signal is automatic in its expansion and its collapsing, and this operation is performed without any complicated mechanism including springs, levers, etc., and there is nothing to get out of order.

The irrigation signal of my invention is installed as shown in FIG. 1, and, if necessary, a pilot hole may be dug to form the pit below the irrigation channel 40 in which the signal is installed. The irrigation signal is sunk into the ground a distance of 6 to 8 inches with the lower collar 15 engaging the bottom of the irrigation ditch. This forms a well in which the float 19 is positioned and into which water may flow from the ditch through the openings 12, the water raising the float and causing the signal 21 to be projected into signalling position.

When irrigation is stopped and the water seeps back into the ground the float will lower and as it does it exerts a small downward force which causes the expandable signal 21 to collapse and move into non-signalling position, as shown in FIG. 3.

I claim:
1. An irrigation signalling device comprising:
   a. an elongated body providing a float chamber, said body being adapted to be installed in an irrigation ditch and having a lower portion which extends downwardly from the bottom of the ditch to form a well therebelow, and having an upwardly extending position which extends a distance above the upper boundary of the ditch;
   b. an entrance opening means provided in said body which connects to the irrigation ditch and permits irrigation water to enter the float chamber of the body;
   c. a float in said body positioned in the well formed in said elongated body, said float being adapted to be moved upwardly as said well fills with water;
   d. a connection means connected to said float and extending upwardly within and to the upper end of said body; and
   e. an expandable signal positioned within the upper end of said body and connected to said connection means, said signal being moved vertically upwardly by said connection means when water enters said well in order to vertically project said signal to a position above the upper end of said body, said signal expanding into expanded position thus signalling the presence of water in said ditch.

2. A combination as defined in claim 1 in which said signal includes a plurality of flexible segments which are folded or nested when in non-signalling position and which, when said signal is projected into signalling position above the upper end of said body, automatically straighten into an expanded position, thus providing a signal of larger diameter than said body.

3. A combination as defined in claim 1 in which said stop means is positioned within said body between said float and said expandable signal, and comprises one stop element secured to said body and a second stop element secured to a rod which comprises the connection means, said elements being engageable upon upward movement of said float and said rod, in order to control the signalling position of said expandable signal above the upper end of said body.

4. A combination as defined in claim 1 in which said signal includes a plurality of flexible segments which are folded or nested when in non-signalling position and which, when said signal is projected into signalling position above the upper end of said body, automatically straighten into an expanded position, thus providing a signal of larger diameter than said body, and in which said stop means is positioned within said body between said float and said expandable signal, and comprises one stop element secured to said body and a second stop element secured to a rod which comprises the connection means, said elements being engageable upon upward movement of said float and said rod, in order to control the signalling position of said expandable signal above the upper end of said body.

5. A combination as defined in claim 2 in which when the water leaves the well of said body and permits said float to move downwardly the downward force is imposed on said expandable signal bringing the lower edges of said segments in engagement with an upper end wall of said body and causing the segments to collapse to permit its diameter to reduce so that it may be pulled downwardly into collapsed position in the upper end of said body.

6. A combination as defined in claim 1 in which the lower edges of the segments of said expandable signal are inclined and wherein the inclination of these lower edges coupled with the downward force causes the collapsible signal to rotate and the segments to move into a collapsed spiral position, thus permitting the signal to move downwardly into the upper end of said body.

* * * * *